(12) United States Patent
Kim et al.

(10) Patent No.: US 11,075,428 B2
(45) Date of Patent: Jul. 27, 2021

(54) SEPARATOR INCLUDING POROUS BONDING LAYER AND ELECTROCHEMICAL BATTERY INCLUDING THE SEPARATOR

(71) Applicant: SAMSUNG SDI CO., LTD., Yongin-si (KR)

(72) Inventors: Byung-Soo Kim, Suwon-si (KR); Sangho Lee, Suwon-si (KR); Jihyun Chun, Suwon-si (KR); Daehyun Hong, Suwon-si (KR); Seyeong Kang, Suwon-si (KR); Jinseong Park, Suwon-si (KR); Imhyuck Bae, Suwon-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 0 days.

(21) Appl. No.: 15/379,540

(22) Filed: Dec. 15, 2016

(65) Prior Publication Data

US 2017/0179456 A1  Jun. 22, 2017

(30) Foreign Application Priority Data

Dec. 22, 2015 (KR) .................. 10-2015-0183927

(51) Int. Cl.
*H01M 10/05* (2010.01)
*H01M 50/44* (2021.01)
(Continued)

(52) U.S. Cl.
CPC ......... *H01M 50/411* (2021.01); *C09D 127/16* (2013.01); *H01M 10/049* (2013.01);
(Continued)

(58) Field of Classification Search
None
See application file for complete search history.

(56) References Cited

U.S. PATENT DOCUMENTS

| 9,601,740 B2* | 3/2017 | Lee | ..... H01M 2/162 |
| 2011/0259505 A1* | 10/2011 | Lee | ..... H01M 2/145 |
| | | | 156/78 |

(Continued)

FOREIGN PATENT DOCUMENTS

| CN | 102468465 A | 5/2012 |
| CN | 102610789 A | 7/2012 |

(Continued)

OTHER PUBLICATIONS

Office Action dated Dec. 20, 2018 of the corresponding Chinese Patent Application No. 201611166051.7.

(Continued)

*Primary Examiner* — Jonathan Crepeau
*Assistant Examiner* — Angela J Martin
(74) *Attorney, Agent, or Firm* — Lee IP Law, P.C.

(57) ABSTRACT

A separator and an electrochemical battery, the separator including a porous substrate; and a porous bonding layer on one surface or both surfaces of the porous substrate, wherein the porous bonding layer includes a first polyvinylidene fluoride-based polymer, the first polyvinylidene fluoride-based polymer including a polyvinylidene fluoride-based homopolymer or a polyvinylidene fluoride-based copolymer that includes a vinylidene fluoride repeating unit and a hexafluoropropylene repeating unit, and a second polyvinylidene fluoride-based polymer, the second polyvinylidene fluoride-based polymer including a vinylidene fluoride repeating unit and a (meth)acrylate repeating unit, or a vinylidene fluoride repeating unit and a repeating unit of a monomer that includes at least one of an epoxy group, a hydroxy group, a carboxyl group, an ester group, or an acid anhydride group.

12 Claims, 1 Drawing Sheet

(51) Int. Cl.
- *H01M 10/04* (2006.01)
- *C09D 127/16* (2006.01)
- *H01M 50/411* (2021.01)
- *H01M 50/446* (2021.01)
- *H01M 50/449* (2021.01)
- *H01M 10/0525* (2010.01)
- *H01M 10/058* (2010.01)

(52) U.S. Cl.
CPC ....... H01M 50/446 (2021.01); H01M 50/449 (2021.01); *C08L 2205/025* (2013.01); *H01M 10/058* (2013.01); *H01M 10/0525* (2013.01)

(56) References Cited

U.S. PATENT DOCUMENTS

| | | | |
|---|---|---|---|
| 2012/0268072 | A1 | 10/2012 | Okuno |
| 2014/0322586 | A1* | 10/2014 | Lee ................. H01M 2/145 429/144 |
| 2016/0293923 | A1* | 10/2016 | Kim ................. C09J 133/08 |

FOREIGN PATENT DOCUMENTS

| | | | |
|---|---|---|---|
| CN | 103477491 A | 12/2013 | |
| JP | 2012-104291 A | 5/2012 | |
| JP | 2013-122009 A | 6/2013 | |
| JP | 2013-161707 A | 8/2013 | |
| JP | 2014-146616 A | 8/2014 | |
| JP | 2015-502636 A | 1/2015 | |
| JP | 2015-170448 A | 9/2015 | |
| JP | 2016-072162 A | 5/2016 | |
| KR | 10-0775310 B1 | 11/2007 | |
| KR | 10-2009-0056811 A | 6/2009 | |
| KR | 10-2010-0016468 A | 2/2010 | |
| KR | 10-2014-0012037 A | 1/2014 | |
| KR | 10-2014-0051218 A | 4/2014 | |
| KR | 10-2014-0051258 A | 4/2014 | |
| KR | 10-2014-0051259 A | 4/2014 | |
| KR | 10-2014-0066786 A | 6/2014 | |
| KR | 10-2014-0128421 A | 11/2014 | |
| KR | 10-2014-0147742 A | 12/2014 | |
| KR | 10-1475791 B1 | 12/2014 | |
| KR | 10-2015-0015918 A | 2/2015 | |
| KR | 10-2015-0059622 A | 6/2015 | |
| KR | 10-2015-0106810 A | 9/2015 | |
| KR | 10-2015-0106811 A | 9/2015 | |
| KR | 20150106811 | * 9/2015 | ......... H01M 10/052 |
| KR | 1020150106810 | * 9/2015 | ............. H01M 2/16 |
| WO | WO 2013-073603 A1 | 5/2013 | |
| WO | WO 2014/086906 A1 | 6/2014 | |
| WO | WO 2014/095907 A1 | 6/2014 | |
| WO | WO 2015-115513 A1 | 8/2015 | |
| WO | WO 2015/170594 A1 | 11/2015 | |
| WO | WO 2015170594 | * 11/2015 | ............. H01M 2/16 |

OTHER PUBLICATIONS

Office Action dated Sep. 9, 2019 of the corresponding Chinese Patent Application No. 201611166051.7.

Chinese Office action dated Mar. 31, 2021.

* cited by examiner

SEPARATOR INCLUDING POROUS BONDING LAYER AND ELECTROCHEMICAL BATTERY INCLUDING THE SEPARATOR

CROSS-REFERENCE TO RELATED APPLICATION

Korean Patent Application No. 10-2015-0183927, filed on Dec. 22, 2015, in the Korean Intellectual Property Office, and entitled: "Separator Comprising Porous Bonding Layer and Electrochemical Battery Comprising the Separator," is incorporated by reference herein in its entirety.

BACKGROUND

1. Field

Embodiments relate to a separator including a porous bonding layer and an electrochemical battery including the same.

2. Description of the Related Art

A separator for an electrochemical battery is a porous film as an interlayer separating positive and negative electrodes in the battery and thus maintaining ion conductivity and charging and discharging the battery.

As technology development and demand of a mobile device have been increased, demand of a rechargeable battery as its energy source also has been rapidly increased. For example, a rechargeable lithium battery having high energy density and a high discharge voltage has been much researched and in addition, commercially available and widely used.

SUMMARY

Embodiments are directed to a separator including a porous bonding layer and an electrochemical battery including the same.

The embodiments may be realized by providing a separator including a porous substrate; and a porous bonding layer on one surface or both surfaces of the porous substrate, wherein the porous bonding layer includes a first polyvinylidene fluoride-based polymer, the first polyvinylidene fluoride-based polymer including a polyvinylidene fluoride-based homopolymer or a polyvinylidene fluoride-based copolymer that includes a vinylidene fluoride repeating unit and a hexafluoropropylene repeating unit, and a second polyvinylidene fluoride-based polymer, the second polyvinylidene fluoride-based polymer including a vinylidene fluoride repeating unit and a (meth)acrylate repeating unit, or a vinylidene fluoride repeating unit and a repeating unit of a monomer that includes at least one of an epoxy group, a hydroxy group, a carboxyl group, an ester group, or an acid anhydride group.

The first polyvinylidene fluoride-based polymer may include the polyvinylidene fluoride-based copolymer, and a content of the hexafluoropropylene of the polyvinylidene fluoride-based copolymer of the first polyvinylidene fluoride-based polymer may be about 5 wt % to about 20 wt %, based on a total weight of the copolymer.

A content of the (meth)acrylate repeating unit may be less than or equal to about 10 wt %, based on a total weight of the second polyvinylidene fluoride-based polymer, or a content of the repeating unit of the monomer including at least one of an epoxy group, a hydroxy group, a carboxyl group, an ester group, or an acid anhydride group may be less than or equal to about 10 wt %, based on the total weight of the second polyvinylidene fluoride-based polymer.

The second polyvinylidene fluoride-based polymer may be a polymer including the (meth)acrylate repeating unit and the vinylidene fluoride repeating unit.

A weight average molecular weight of the polyvinylidene fluoride-based homopolymer of the first polyvinylidene fluoride-based polymer may be greater than or equal to about 1,000,000, or a weight average molecular weight of the polyvinylidene fluoride-based copolymer including the vinylidene fluoride repeating unit and the hexafluoropropylene repeating unit of the first polyvinylidene fluoride-based polymer may be less than or equal to about 800,000.

A weight average molecular weight of the second polyvinylidene fluoride-based polymer may be greater than or equal to about 800,000.

A weight ratio of the first polyvinylidene fluoride-based polymer and the second polyvinylidene fluoride-based polymer may be about 1:9 to about 6:4.

The porous bonding layer may further include inorganic particles.

A weight ratio of the inorganic particles to the first polyvinylidene fluoride-based polymer and the second polyvinylidene fluoride-based polymer may be about 8:2 to about 2:8.

An average transfer rate of positive and negative active materials into the separator may be greater than or equal to about 30% after charge and discharge, as calculated by Equation 1:

$$\text{Transfer rate (\%)} = (A_1/A_0) \times 100 \qquad \text{Equation 1}$$

wherein in Equation 1, $A_0$ denotes the entire area of both surfaces of the separator, $A_1$ denotes an area sum of positive and negative active materials transferred into the separator when a cell is manufactured by interposing the separator between positive and negative electrodes, primarily compressing them at about 95° C. to about 105° C. for about 1 to about 5 seconds with a pressure of about 1 to about 5 kgf/cm², injecting an electrolyte solution into the compressed positive electrode/separator/negative electrode structure, and secondarily compressing it at about 95° C. to about 105° C. for about 25 to about 40 seconds with a pressure of about 10 to about 200 kgf/cm² and then, sequentially charging and discharging under the following conditions:

Charge: 4.35 V, 0.2 C, 50 mA cut-off, and 5 hours,
Discharge: 0.2 C, 3 V cut-off, and 5 hours, and
Charge: 0.5 C, 4 V cut-off, and 2 hours.

An air permeability of the separator may be less than or equal to about 300 sec/100 cc.

An adhesion force of the porous bonding layer to the porous substrate may be greater than or equal to about 0.05 N/mm.

The embodiments may be realized by providing an electrochemical battery including a positive electrode; a negative electrode; the separator according to an embodiment; and an electrolyte solution.

An adhesion force of the separator to the positive electrode may be greater than or equal to about 0.5 gf/5 mm, and an adhesion force of the separator to the negative electrode may be greater than or equal to about 0.1 gf/5 mm.

The electrochemical battery may be a rechargeable lithium battery.

BRIEF DESCRIPTION OF THE DRAWING

Features will be apparent to those of skill in the art by describing in detail exemplary embodiments with reference to the attached drawings in which.

DETAILED DESCRIPTION

Example embodiments will now be described more fully hereinafter with reference to the accompanying drawing; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing FIGURE, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present. Like reference numerals refer to like elements throughout.

In this disclosure, 'homopolymer' refers to a polymerized polymer of one monomer and a 'copolymer' of a polymerized polymer of two or more monomers.

According to an example embodiment, a separator may include a porous substrate; and a porous bonding layer on one surface or both surfaces of the porous substrate. The porous bonding layer may include, e.g., (A) a first polyvinylidene fluoride (PVdF)-based polymer and (B) a second polyvinylidene fluoride-based polymer. In an implementation, the first polyvinylidene fluoride (PVdF)-based polymer may be a polyvinylidene fluoride-based homopolymer or a polyvinylidene fluoride-based copolymer including a vinylidene fluoride monomer repeating unit (e.g., a vinylidene fluoride repeating unit) and a hexafluoropropylene monomer repeating unit (e.g., a hexafluoropropylene repeating unit).

In an implementation, the second polyvinylidene fluoride-based polymer may include, e.g., a (meth)acrylate monomer repeating unit (e.g., a (meth)acrylate repeating unit) or a unit derived from at least one monomer that includes an epoxy group, a hydroxy group, a carboxyl group, an ester group, or an acid anhydride group (b1) and a vinylidene fluoride monomer repeating unit (b2). For example, the second polyvinylidene fluoride-based polymer may be a copolymer including a vinylidene fluoride repeating unit and a (meth)acrylate repeating unit or may be a copolymer including a vinylidene fluoride repeating unit and a repeating unit of a monomer including an epoxy group, a hydroxy group, a carboxyl group, an ester group, and/or an acid anhydride group.

The porous substrate may have a plurality of pores and may be a suitable porous substrate for an electrochemical device. Examples of the porous substrate may include a polymer film formed of a polymer or a mixture of two or more of polyolefin such as polyethylene, polypropylene and the like, a polyester such as polyethylene terephthalate, polybutylene terephthalate and the like, polyacetal, polyamide, polyimide, polycarbonate, polyetheretherketone, polyaryletherketone, polyetherimide, polyamideimide, polybenzimidazole, polyethersulfone, polyphenyleneoxide, a cyclic olefin copolymer, polyphenylene sulfide, and polyethylene naphthalate. For example, the porous substrate may be a polyolefin-based substrate, and the polyolefin-based substrate may improve safety of a battery due to its improved shut-down function. The polyolefin-based substrate may be, e.g., a polyethylene single film, a polypropylene single film, a polyethylene/polypropylene double film, a polypropylene/polyethylene/polypropylene triple film, or a polyethylene/polypropylene/polyethylene triple film. In an implementation, the polyolefin-based resin may include a non-olefin resin in addition to an olefin resin or a copolymer of olefin and a non-olefin monomer.

The porous substrate may have a thickness of about 1 μm to about 40 μm, e.g., about 5 μm to about 20 μm or about 5 μm to about 16 μm. When the porous substrate has a thickness within the ranges, the porous substrate may have a desirable thickness, that is it is sufficiently thick so that short circuit between a positive electrode and a negative electrode may be reduced and/or prevented, while not being so thick that internal resistance of a battery is increased.

The porous substrate may have a porosity of about 30% to about 80%, e.g., about 40% to about 60%, and air permeability of less than or equal to about 250 sec/100 cc, e.g., less than or equal to about 200 sec/100 cc or less than or equal to about 150 sec/100 cc.

The porous bonding layer may be formed of a porous bonding layer composition. In an implementation, the porous bonding layer composition may include (A) the first polyvinylidene fluoride-based polymer, e.g., at least one of the polyvinylidene fluoride-based homopolymer or the polyvinylidene fluoride-based copolymer including a vinylidene fluoride repeating unit and a hexafluoropropylene repeating unit, (B) the second polyvinylidene fluoride-based polymer, e.g., including the vinylidene fluoride repeating unit and the (meth)acrylate repeating unit or including the vinylidene fluoride repeating unit and the repeating unit of a monomer including at least one of an epoxy group, a hydroxy group, a carboxyl group, an ester group, and an acid anhydride group, and a solvent.

According to an embodiment, by using the first polyvinylidene fluoride-based polymer and the second polyvinylidene fluoride-based polymer together, a coating process using an organic solvent is possible, and a separator having improved adhesion forces to a substrate and an electrode may be manufactured.

The (A) first polyvinylidene fluoride-based polymer may be a polyvinylidene fluoride-based homopolymer, a polyvinylidene fluoride-based copolymer including a vinylidene fluoride repeating unit and a hexafluoropropylene repeating unit, or a combination thereof.

The polyvinylidene fluoride-based homopolymer refers to a polymer consisting of a vinylidene fluoride repeating unit or a polymer including other repeating units in an amount of less than or equal to about 3 wt % in addition to the vinylidene fluoride repeating unit. In an implementation, the other repeating unit may be a repeating unit derived from, e.g., hexafluoropropylene (HFP), trichloroethylene (TFE), or the like.

The polyvinylidene fluoride-based copolymer including the vinylidene fluoride repeating unit and the hexafluoropropylene repeating unit may be prepared by copolymerizing a vinylidene fluoride monomer and a hexafluoropropylene monomer. In an implementation, the hexafluoropropylene repeating unit may be included in an amount of about 5 wt % to about 20 wt %, e.g., about 5 wt % to about 15 wt % or about 10 wt % to about 15 wt %, based on a total weight of the polyvinylidene fluoride-based copolymer. When the hexafluoropropylene monomer-derived unit is included within the ranges, the polyvinylidene fluoride-based copolymer may be dissolved in a low-boiling-point organic solvent. Therefore, the polyvinylidene fluoride-based copolymer including the vinylidene fluoride repeating unit and the hexafluoropropylene repeating unit may be used as a first polyvinylidene fluoride-based polymer, adhesion forces to a substrate and an electrode may be improved, and deterioration of air permeability may be prevented.

In an implementation, the polyvinylidene fluoride-based copolymer including the vinylidene fluoride repeating unit and the hexafluoropropylene repeating unit may further include other repeating units in addition to the vinylidene fluoride repeating unit and the hexafluoropropylene repeating unit. In an implementation, the other repeating units may be derived from, e.g., chlorotrifluoroethylene (CTFE), trifluoroethylene (TFE), ethylene tetrafluoride, or ethylene.

The other repeating unit may be included in an amount of less than or equal to about 3 wt %, e.g., less than or equal to about 1 wt %, based on the total weight of the polyvinylidene fluoride-based copolymer. Within the ranges, stability of a separator may be improved.

In the (A) first polyvinylidene fluoride-based polymer, the polyvinylidene fluoride-based homopolymer may have a weight average molecular weight (Mw) of, e.g., greater than or equal to about 1,000,000. In an implementation, the polyvinylidene fluoride-based homopolymer may have a weight average molecular weight of about 1,000,000 to about 2,000,000, e.g., about 1,000,000 to about 1,700,000. Within the ranges, an adhesion force between the bonding layer and the porous substrate may be improved.

In an implementation, in the (A) first polyvinylidene fluoride-based polymer, the polyvinylidene fluoride-based copolymer including the vinylidene fluoride repeating unit and the hexafluoropropylene repeating unit may have a weight average molecular weight (Mw) of less than or equal to about 800,000, e.g., about 300,000 to about 800,000, or about 400,000 to about 700,000. Within the weight average molecular weight ranges, the polyvinylidene fluoride-based copolymer may be smoothly dissolved in a solvent, electrolyte impregnation properties may be improved, and adhesion forces between the substrate and the electrode may also be improved.

The (B) second polyvinylidene fluoride-based polymer may be prepared by copolymerizing a vinylidene fluoride monomer with a (meth)acrylate monomer, or copolymerizing a vinylidene fluoride monomer with a monomer including a substituent selected from an epoxy group, a hydroxy group, a carboxyl group, an ester group, and an acid anhydride group.

The (meth)acrylate monomer may include, e.g., an alkyl (meth)acrylate such as acrylic acid; methylmethacrylate, methyl acrylate, and the like; a bifunctional (meth)acrylate such as ethylene glycol di(meth)acrylate, propylene glycol di(meth)acrylate, polyethylene glycol di(meth)acrylate, polypropylene glycol di(meth)acrylate, a di(meth)acrylate of a polyoxyethylene/polyoxypropylene copolymer, butanediol di(meth)acrylate, hexamethylene glycol di(meth)acrylate, and the like; a tri-functional (meth)acrylate such as trimethylol propane tri(meth)acrylate, glycerine tri(meth) acrylate, a tri(meth)acrylate of an ethylene oxide addition product of glycerine, a tri(meth)acrylate of a propylene oxide addition product of glycerine, ethylene oxide of glycerine, a tri(meth)acrylate of a propylene oxide addition product, and the like; a multi-functional (meth)acrylate such as diglycerine hexa(meth)acrylate, and the like.

For example, the (meth)acrylate monomer may be acrylic acid; or alkyl(meth)acrylate such as methylmethacrylate, methyl acrylate, and the like.

The monomer including a group selected from an epoxy group, a hydroxy group, a carboxyl group, an ester group, and an acid anhydride group may include, e.g., a diepoxyalkane such as diepoxyethane, diepoxypropane, diepoxybutane, diepoxypentane, diepoxyhexane, diepoxyheptane, diepoxyoctane, diepoxynonane, diepoxydodecane, and the like; a glycidyl ether such as bisphenol A diglycidylether, bisphenol F diglycidylether, bromide bisphenol A diglycidylether, phenol novolac glycidylether, cresol novolac glycidylether, and the like; a glycidyl ester such as hexahydrophthalic acid glycidylester, dimeric acid glycidyl ester, and the like; a glycidyl amine such as glycidyl isocyanurate, tetraglycidyl diamino phenylmethane, and the like; a linear aliphatic epoxide such as epoxylated polybutadiene, and the like; an alicyclic epoxide such as 3,4-epoxy-6-methylcyclohexylmethylcarboxylate, 3,4-epoxycyclohexylmethylcarboxylate, and the like; a diol such as biphenol, bisphenol A, methanediol, ethanediol, propanediol, butanediol, pentanediol, hexanediol, heptanediol, octanediol, nonanediol, decanediol, and the like; a diisocyanate such as 4,4'-diphenylenemethane diisocyanate, toluene diisocyanate, tolylene diisocyanate, naphthylene diisocyanate, 4,4'-4,4'-dicyclohexylenemethane diisocyanate, cyclohexylene diisocyanate, 3,3'-dimethylphenylene diisocyanate, diphenylmethane diisocyanate, 3,3'-dimethyl diphenylenemethane diisocyanate, 4,6'-xylylene diisocyanate, 4,4'-dicyclohexylmethane diisocyanate, 3,5,5-trimethylcyclohexylene diisocyanate, 1,6-hexamethylene diisocyanate, 2,2,4-trimethyl-hexamethylene diisocyanate, m-xylene diisocyanate, trimethylxylene diisocyanate, p-phenylene diisocyanate, isophorone diisocyanate, 1,5-naphthalene diisocyanate, trans-1,4-cyclohexyl diisocyanate, and the like.

For example, the (B) second polyvinylidene fluoride-based polymer may include a (meth)acrylate repeating unit and a vinylidenefluoride repeating unit.

The (meth)acrylate repeating unit, or the repeating unit derived from a monomer including at least one group selected from an epoxy group, a hydroxy group, a carboxyl group, an ester group, and an acid anhydride group may be included in an amount of less than or equal to about 10 wt %, e.g., 9 wt %, or less than or equal to about 5 wt %, or greater than about 0 wt % and less than or equal to about 3 wt %, or about 0.1 wt % to about 3 wt %, based on the total weight of the (B) second polyvinylidene fluoride-based polymer. Within the ranges, the second polyvinylidene fluoride-based polymer has improved solubility in an organic solvent and is not dissolved in an electrolyte solution, and has improved adhesion forces to an electrode and a substrate.

The (B) second polyvinylidene fluoride-based polymer may include other repeating units in addition to the (meth) acrylate repeating unit, or the repeating unit derived from the monomer including at least one group selected from an epoxy group, a hydroxy group, a carboxyl group, an ester group, and an acid anhydride group and the vinylidene fluoride repeating unit. Examples of the other repeating unit may include a repeating unit of chlorotrifluoroethylene, trifluoroethylene, ethylene tetrafluoride, and ethylene.

An amount of the other repeating unit may be less than or equal to about 3 wt %, e.g., less than or equal to about 1 wt % based on the total weight of the (B) second polyvinylidene fluoride-based polymer, and within the ranges, stability of a separator may be improved.

In an implementation, the (B) second polyvinylidene fluoride-based polymer may have a weight average molecular weight of greater than or equal to about 800,000, e.g. about 800,000 to about 1,500,000, or about 900,000 to about 1,200,000. Within the weight average molecular weight ranges, the second polyvinylidene fluoride-based polymer may help improve an adhesion force between the bonding layer and the porous substrate, short circuit between a positive electrode and a negative electrode may be effectively suppressed, it may be smoothly dissolved in an organic solvent, and electrolyte impregnation properties in a battery may be improved.

In an implementation, a weight ratio of the (A) first polyvinylidene fluoride-based polymer and the (B) second polyvinylidene fluoride-based polymer may be about 1:9 to about 6:4, e.g., about 2:8 to about 6:4, or about 2:8 to about 5:5. Including the (A) first polyvinylidene fluoride-based polymer and the (B) second polyvinylidene fluoride-based polymer within the range may show an excellent adhesion force to electrodes as well as excellent solubility in an organic solvent and thus a low remaining content of the organic solvent after forming a bonding layer and sufficient air permeability of the separator and accordingly, may help reduce and/or prevent deformation of a battery shape. In addition, an excellent adhesion force to electrodes may be obtained after charge and discharge.

In an implementation, a total weight of the (A) first polyvinylidene fluoride-based polymer and the (B) second polyvinylidene fluoride-based polymer may be about 10 wt % to about 100 wt %, e.g., about 10 wt % to about 90 wt %, or about 10 wt % to about 70 wt %, about 20 wt % to about 60 wt %, based on the total weight of a dried bonding layer (e.g., based on a total weight of the porous bonding layer in terms of solid content).

In an implementation, the porous bonding layer may further include other binders, in addition to the (A) first polyvinylidene fluoride-based polymer and the (B) second polyvinylidene fluoride-based polymer. The other binders that may be added may include, e.g., polymethylmethacrylate, polyacrylonitrile, polyvinylpyrrolidone, polyvinylacetate, polyethylene oxide, cellulose acetate, cellulose acetate butyrate, cellulose acetate propionate, cyanoethylullulan, cyanoethylpolyvinyl alcohol, cyanoethyl cellulose, cyanoethylsucrose, pullulan, carboxyl methyl cellulose, or an acrylonitrilestyrene-butadiene copolymer.

In an implementation, the bonding layer may further include an inorganic particle.

The inorganic particle may be a suitable inorganic particle for separators. Examples of the inorganic particle may include boehmite, $Al_2O_3$, $SiO_2$, $B_2O_3$, $Ga_2O_3$, $TiO_2$, or $SnO_2$, and these may be used alone or in a mixture of two or more. For example, the inorganic particle may be $Al_2O_3$ (alumina).

In an implementation, a average particle diameter of the inorganic particle may be about 1 nm to about 2,000 nm, e.g., about 100 nm to about 1,000 nm, or about 300 nm to about 500 nm. When the inorganic particle has the size within the ranges, dispersibility of the inorganic particle in a bonding layer composition and formation processibility of a porous adhesive layer may be prevented from being deteriorated, a thickness of the porous adhesive layer may be appropriately controlled and thus reduction of mechanical properties and increase of electrical resistance may be prevented. In addition, sizes of pores generated in the separator may be appropriately controlled and thus internal a possibility of short-circuit may be reduced during charge and discharge of a battery.

In the bonding layer, the inorganic particle may be included in an amount of, e.g., less than or equal to about 99 wt %, less than or equal to about 95 wt %, less than or equal to about 90 wt %, or less than or equal to about 70 wt %, and greater than or equal to about 20 wt %, greater than or equal to about 30 wt %, greater than or equal to about 40 wt %, greater than or equal to about 50 wt %, or greater than or equal to about 60 wt %, based on the total weight of the dried bonding layer. When the inorganic particle is included within the ranges, heat dissipation properties of the inorganic particle may be sufficiently realized and thermal shrinkage of the separator may be effectively suppressed.

In the porous bonding layer, a ratio of weights of the (A) first polyvinylidene fluoride-based polymer and (B) second polyvinylidene fluoride-based polymer and a weight of the inorganic particle may be about 8:2 to about 2:8, e.g., about 7:3 to about 3:7, or about 7:3 to about 4:6. Within the ranges, heat resistance of the separator as well as adhesion forces of the porous boning layer to an electrode and a substrate may be improved.

In order to manufacture the separator according to example embodiments, the (A) first polyvinylidene fluoride-based polymer and the (B) second polyvinylidene fluoride-based polymer may be respectively dissolved in a suitable solvent to prepare a bonding layer composition.

The (A) first polyvinylidene fluoride-based polymer may have a relatively high solubility in an organic solvent and thus may be dissolved in a low-boiling-point solvent such as acetone, tetrahydrofuran, methylene chloride, chloroform, cyclohexane, or the like to prepare a polymer solution. A large amount of high-boiling-point solvent may remain in a bonding layer after a drying process and could thus deteriorate electrode adhesion forces after charge and discharge, but the (A) first polyvinylidene fluoride-based polymer, e.g., a polyvinylidene fluoride-based copolymer, may have excellent solubility in the low boiling point solvent and thus may reduce an amount of the high-boiling-point solvent that is used. In the present disclosure, the 'low-boiling-point solvent' may have a boiling point of less than or equal to about 90° C., and the high-boiling-point solvent may have a boiling point of greater than 90° C. For example, the low-boiling-point solvent may include alcohols such as methanol, ethanol, isopropylalcohol, and the like; ketones such as acetone and the like, and the high-boiling-point solvent may include N-methylpyrrolidone (NMP), dimethyl acetamide (DMAc), and the like.

The (B) second polyvinylidene fluoride-based polymer may be dissolved in a high-boiling-point solvent such as dimethyl acetamide, dimethyl formamide, dimethylsulfoxide, dimethylcarbonate, N-methylpyrrolidone, or the like or a mixed solvent of the high-boiling-point solvent with a low-boiling-point solvent to prepare a polymer solution.

According to another example embodiment, when an inorganic particle is additionally included, an inorganic dispersion liquid may be prepared by using acetone. Subsequently, the polymer solution and the inorganic dispersion liquid may be mixed with an appropriate solvent to prepare a bonding layer composition.

In the present disclosure, the solvent may be an organic solvent. For example, the solvent may be ketones such as acetone, alcohols such as methanol, ethanol, isopropylalcohol, and the like, dimethyl acetamide (DMAc), tetrahydrofuran, methylene chloride, chloroform, dimethyl formamide, N-methyl-2-pyrrolidone (NMP), cyclohexane, or the like. More than one or two kinds of these solvents may be mixed.

The porous bonding layer composition may be prepared as a mixture by sufficiently stirring the polymer solution and the solvent with, e.g., a ball mill, a beads mill, a screw mixer, or the like.

In an implementation, before forming the porous bonding layer on one surface or both surfaces of the porous substrate, the porous substrate may be pre-treated, e.g., sulfonated, graft-treated, corona-discharged, radiated by ultraviolet rays, plasma-treated, spatter-etched, or the like to help improve close contacting property between the porous substrate and the porous bonding layer.

A method of forming the porous bonding layer on the porous substrate may include a suitable method, e.g., coating, lamination, coextrusion, and the like. Examples of the coating may include roll coating, spin coating, dip coating, flow coating, spray coating, bar coating, and the like. The porous bonding layer of the separator may be, e.g., formed through dip coating or spin coating.

After forming the porous bonding layer on the porous substrate by using the porous bonding layer composition, the porous bonding layer may be dried using a suitable method.

The drying process may be, e.g., performed through hot-air drying method. The drying process may be performed at a temperature ranging from about 70° C. to about 120° C. When the drying process is performed within the temperature range, the drying process may be finished within an appropriate time. For example, the drying process may be performed for only a short time and still may prevent generation of a surface concavo-convex due to extreme drying and thus form a bonding layer having a relatively smooth surface.

The porous bonding layer may have a total thickness of about 1 μm to about 15 μm. For example, the thickness may be in a range of about 1 μm to about 6 μm. Within the range, the bonding layer may be neither contracted nor broken and may have excellent heat resistance.

In an implementation, air permeability of the separator according to an example embodiment may be less than or equal to about 300 sec/100 cc, e.g., about 100 sec/100 cc to about 300 sec/100 cc, or about 150 sec/100 cc to about 250 sec/100 cc.

The air permeability may be measured using a suitable method, e.g., ten specimens may be obtained from ten different points of a separator, EG01-55-1MR (Asahi Seiko Inc.) may be used to five times measure how long it takes for 100 cc of air to pass a circular area with a diameter of 1 inch in each specimen, and the five measurements may be averaged.

In the separator, an average transfer rate of Equation 1 of positive and negative active materials into the separator may be greater than or equal to about 30%.

$$\text{Transfer rate } (\%) = (A_1/A_0) \times 100 \qquad \text{[Equation 1]}$$

In Equation 1, $A_0$ denotes the entire area of both surfaces of a separator, $A_1$ is a sum area of positive and negative active materials transferred into or onto the separator when charged, discharged, and charged sequentially a battery manufactured by interposing the separator between positive and negative electrodes, primarily compressing them at about 95° C. to about 105° C. for about 1 to about 5 seconds with a pressure of about 1 to about 5 kgf/cm², injecting an electrolyte solution into the compressed positive electrode/separator/negative electrode structure, and secondarily compressing it at about 95° C. to about 105° C. for about 25 to about 40 seconds with a pressure of about 10 to about 200 kgf/cm². The areas of the positive and negative active materials may be measured by using a suitable image analyzer.

Conditions of the charge, discharge, and charge are as follows.

(Charge) 4.35 V, 0.2 C, 50 mA cut-off, and 5 hours
(Discharge) 0.2 C, 3 V cut-off, and 5 hours
(Charge) 0.5 C, 4 V cut-off, and 2 hours When the positive or negative active material is transferred into the separator at a transfer rate of greater than or equal to about 30%, a battery internal resistance increase due to a non-uniform distance between electrodes and thus battery performance deterioration may be minimized by reducing a battery shape change due to deterioration of electrode adhesion forces in an environment where a battery is repetitively expanded and contracted. In an implementation, the transfer rate may be greater than or equal to about 40%, e.g., greater than or equal to about 50% or greater than or equal to about 60%.

In the separator, adhesion forces between the porous substrate and the porous bonding layer may be greater than or equal to about 0.05 N/mm, e.g., greater than or equal to about 0.08 N/mm, greater than or equal to about 0.1 N/mm, or about 0.1 N/mm to about 3.0 N/mm. When the porous bonding layer has adhesion forces to the substrate within the ranges, adhesion forces between the porous substrate and the bonding layer may be improved and long-term performance of a battery may be maintained.

The adhesion forces to the substrate may be measured using a suitable method. Examples of a method of measuring the adhesion forces of the separator to the substrate may be as follows: According to the Korean Industrial Standard, KS-A-01107 (a test method of an adhesive tape and sheet). Article 8, a separator is cut to have a width of 25 mm and a length of 250 mm, a tape (Nitto 31B) is respectively adhered both surfaces thereof to obtain a specimen, and the specimen is compressed by once reciprocating a roller having a load of 2 kg at a speed of 300 mm/min. Thirty minutes later after the compression, the specimen is 180° overturned and about 25 mm peeled off, and the separator and the tape on one surface of the separator are fixed into an upper clip of a tensile strength tester (Instron Series 1X/s Automated materials Tester-3343, Instron). The tape on the other surface of the separator is fixed into a lower clip and pulled at a speed of 60 mm/min to measure a pressure when the porous bonding layer is peeled off from the porous substrate and thus obtain the substrate adhesion forces.

The separator may have adhesion forces to a positive electrode of greater than or equal to about 0.5 gf/5 mm and adhesion forces to a negative electrode of greater than or equal to about 0.1 gf/5 mm. For example, the adhesion forces to a positive electrode may be greater than or equal to about 0.8 gf/5 mm, and the adhesion forces to a negative electrode may be greater than or equal to about 0.2 gf/5 mm. Within the ranges, the separator may be sufficiently adhered to positive and negative electrodes and thus may minimize shape changes of a battery including the separator under an environment where the battery is repetitively expanded and contracted due to repetitive charge and discharge and also secure a short ion transfer distance and thus improve output efficiency of the battery.

The adhesion forces to a positive or negative electrode may be measured using a suitable method, e.g., the following method. The adhesion forces may be measured according to the Korean Industrial Standard, KS-A-01107 (a method of testing an adhesive tape and sheet) Article 8. A separator film is cut to have a width of about 25 mm and a length of 250 mm, and a tape (Nitto 31B) is adhered to one surface of the separator to obtain a specimen. On the other surface of the separator, a positive electrode film (positive active material (LCO (lithium cobalt oxide))/binder (styrene butadiene rubber (SBR)+carboxyl methyl cellulose (CMC))/conductive material (carbon black)=95/2.5/2.5) or a negative electrode film (negative active material (natural graphite)/binder (styrene butadiene rubber (SBR)+carboxyl methyl cellulose (CMC) 5%)/conductive material (carbon black)=98/1/1) is compressed by once reciprocating a roller having a load of about 2 kg at about 300 mm/min. Thirty minutes after the compression, the specimen is 180° overturned and about 25 mm peeled off, the separator and the tape (31B) adhered on one surface of the separator are fixed into an upper clip of a tensile strength tester, a positive or negative electrode film is adhered on the other surface of the separator and pulled at about 60 mm/min to measure a pressure when the positive or negative electrode film is peeled off from the separator. The tensile strength tester may be for example, Instron Series 1X/s Automated materials Tester-3343.

According to another example embodiment, an electrochemical battery may include a positive electrode; a negative electrode; the separator of the present disclosure between the positive electrode and the negative electrode; and an electrolyte.

The electrochemical battery may be a suitable battery.

The electrochemical battery of the present disclosure may be, e.g., a rechargeable lithium battery such as a rechargeable lithium metal battery, a rechargeable lithium ion battery, a rechargeable lithium polymer battery, or a rechargeable lithium ion polymer battery.

A method of manufacturing the electrochemical battery may include a suitable method.

An example of a method of manufacturing the electrochemical battery is as follows: the separator including a porous bonding layer is disposed between a positive electrode and a negative electrode of a battery, and then filling an electrolyte solution therein.

Figure 1:
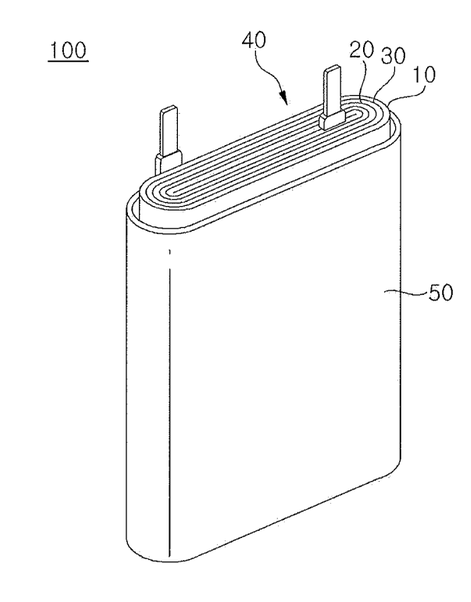
FIG. 1 illustrates an exploded perspective view of a rechargeable lithium battery according to one embodiment.

FIG. 1 illustrates an exploded perspective view of an electro-chemical battery according to an embodiment. An electrochemical battery according to an embodiment may be a prismatic battery. In an implementation, the battery may be, e.g., a pouch type battery, a lithium polymer battery, a cylindrical battery, or the like.

Referring to FIG. 1, a rechargeable battery 100 according to an embodiment may include a wound electrode assembly 40 including a separator 30 between a positive electrode 10 and a negative electrode 20, and a case 50 housing the electrode assembly 40. The positive electrode 10, the negative electrode 20, and the separator 30 are impregnated in an electrolyte solution.

The separator 30 is the same as described above according to an embodiment.

The positive electrode 10 may include a positive current collector and a positive active material layer formed on the positive current collector. The positive active material layer may include a positive active material, a binder, and optionally a conductive material.

The positive current collector may include aluminum (Al), nickel (Ni), and the like.

The positive active material may include a compound being capable of intercalating and deintercalating lithium. For example, at least one of a composite oxide or a composite phosphate of a metal selected from cobalt, manganese, nickel, aluminum, iron, or a combination thereof and lithium may be used. For example, the positive active material may include lithium cobalt oxide, lithium nickel oxide, lithium manganese oxide, lithium nickel cobalt manganese oxide, lithium nickel cobalt aluminum oxide, lithium iron phosphate, or a combination thereof.

The binder may help improve binding properties of positive active material particles with one another and with a current collector, and examples may include polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like. These may be used alone or as a mixture of two or more.

The conductive material may help improve conductivity of an electrode, and examples thereof may include natural graphite, artificial graphite, carbon black, a carbon fiber, a metal powder, a metal fiber, and the like. These may be used alone or as a mixture of two or more. The metal powder and the metal fiber may include copper, nickel, aluminum, silver, and the like.

The negative electrode 20 may include a negative current collector and a negative active material layer formed on the negative current collector.

The negative current collector may include copper (Cu), gold (Au), nickel (Ni), a copper alloy, and the like.

The negative active material layer may include a negative active material, a binder and optionally a conductive material.

The negative active material may be a material that reversibly intercalates/deintercalates lithium ions, a lithium metal, a lithium metal alloy, a material being capable of doping and dedoping lithium, a transition metal oxide, or a combination thereof.

The material that reversibly intercalates/deintercalates lithium ions may be a carbon material which is a suitable carbon-based negative active material, and examples thereof may include crystalline carbon, amorphous carbon, or a combination thereof. Examples of the crystalline carbon may include graphite such as amorphous, sheet-shape, flake, spherical shape or fiber-shaped natural graphite or artificial graphite. Examples of the amorphous carbon may include soft carbon or hard carbon, a mesophase pitch carbonized product, fired coke, and the like. The lithium metal alloy may include an alloy of lithium and a metal selected from Na, K, Rb, Cs, Fr, Be, Mg, Ca, Sr, Si, Sb, Pb, In, Zn, Ba, Ra, Ge, Al, and Sn. The material being capable of doping and dedoping lithium may be Si, $SiO_x$ (0<x<2), a Si—C composite, a Si—Y' alloy, Sn, $SnO_2$, a Sn—C composite, a Sn—Y', and the like, and at least one of these may be mixed with $SiO_2$. Specific examples of the element Y' may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof. The transition metal oxide may include vanadium oxide, lithium vanadium oxide, and the like.

The binder and the conductive material used in the negative electrode may be the same as the binder and conductive material of the positive electrode.

The positive electrode and the negative electrode may be manufactured by mixing each active material composition including each active material and a binder, and optionally a conductive material in a solvent, and coating the active material composition on each current collector. Herein, the solvent may include N-methylpyrrolidone, and the like.

The electrolyte solution may include an organic solvent and a lithium salt.

The organic solvent serves as a medium for transmitting ions taking part in the electro-chemical reaction of a battery. Examples thereof may be selected from a carbonate-based solvent, an ester-based solvent, an ether-based solvent, a ketone-based solvent, an alcohol-based solvent, and an aprotic solvent.

Examples of the carbonate-based solvent may include dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), and the like. For example, when the linear carbonate compounds and cyclic carbonate compounds are mixed, an organic solvent having a high dielectric constant and a low viscosity may be provided.

Herein, the cyclic carbonate compound and the linear carbonate compound may be mixed together in a volume ratio ranging from about 1:1 to about 1:9.

Examples of the ester-based solvent may include methylacetate, ethylacetate, n-propylacetate, dimethylacetate, methylpropionate, ethylpropionate, γ-butyrolactone, decanolide, valerolactone, mevalonolactone, caprolactone, and the like. Examples of the ether-based solvent may be dibutylether, tetraglyme, diglyme, dimethoxyethane, 2-methyltetrahydrofuran, tetrahydrofuran, and the like. Examples of the ketone-based solvent may include cyclohexanone, and the like, and examples of the alcohol-based solvent may include ethanol, isopropyl alcohol, and the like.

The organic solvent may be used singularly or in a mixture of two or more, and when the organic solvent is used in a mixture of two or more, the mixture ratio may be controlled in accordance with a desirable cell performance.

The lithium salt may be dissolved in an organic solvent, supplies lithium ions in a battery, basically operates an electro-chemical battery, and improves lithium ion transportation between positive and negative electrodes therein.

Examples of the lithium salt may include $LiPF_6$, $LiBF_4$, $LiSbF_6$, $LiAsF_6$, $LiN(SO_3C_2F_5)_2$, $LiN(CF_3SO_2)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (x and y are natural numbers), LiCl, LiI, $LiB(C_2O_4)_2$, or a combination thereof.

The lithium salt may be used in a concentration ranging from about 0.1 M to about 2.0 M. When the lithium salt is included within the above concentration range, an electrolyte may have improved performance and lithium ion mobility due to optimal electrolyte conductivity and viscosity.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Example: Manufacture of Separator

Example 1

1. Preparation of Porous Bonding Layer Composition

A 10 wt % first polyvinylidene fluoride-based polymer solution was prepared by dissolving a first polyvinylidene fluoride-based polymer (weight average molecular weight of about 500,000 and hexafluoropropylene (HFP) content of 12 wt % (Solef21216, Solvay)) in acetone (Daejung Chemicals & Metals Co., Ltd.) and stirring the solution with an agitator at 25° C. for 4 hours.

A 10 wt % second polyvinylidene fluoride-based polymer solution was prepared by dissolving a second polyvinylidene fluoride-based polymer (weight average molecular weight of about 1,100,000 and acrylic acid (AA) content of less than 1 wt % (Solef5130, Solvay)) in a mixed solvent of acetone/dimethyl acetamide (DMAc) (weight ratio=80:20) and stirring the solution at 25° C. for 4 hours.

The first and second polyvinylidene fluoride-based polymer solutions were mixed in a polymer weight ratio of 2:8 and then, stirred with a power blender at 25° C. for 2 hours to prepare a bonding layer composition.

2. Manufacture of Separator

The bonding layer composition was dip-coated on both sides of a 9 μm-thick polyethylene single layer substrate film and then, dried at 80° C. and a wind speed of 15 m/sec for 0.03 hours to form a bonding layer with a total thickness of 2 μm and thus manufacture a separator.

Example 2

A bonding layer composition and a separator were prepared according to the same method as Example 1 except for mixing the first and second polyvinylidene fluoride-based polymer solutions in a polymer weight ratio of 3:7.

Example 3

A bonding layer composition and a separator were prepared according to the same method as Example 1 except for mixing the first and second polyvinylidene fluoride-based polymer solutions in a polymer weight ratio of 5:5, preparing an inorganic dispersion liquid by adding 25 wt % of alumina ($Al_2O_3$, Nippon Light Metal Company, Ltd., Japan) to acetone and ball-milling the mixture at 25° C. for 3 hours, adding the inorganic dispersion liquid to the first and second polyvinylidene fluoride-based polymer solution mixture in a weight ratio of 5:5 between first and second polyvinylidene fluoride-based polymers:alumina.

Example 4

A bonding layer composition and a separator were prepared according to the same method as Example 1 except for using a second polyvinylidene fluoride-based polymer having a weight average molecular weight of about 1,000,000 and a carboxyl group content of about 1 wt % (KF9300, Kureha Inc.) instead of the second polyvinylidene fluoride-based polymer having a weight average molecular weight of about 1,100,000 and an acrylic acid (AA) content of less than 1 wt %.

Comparative Example 1

A bonding layer composition and a separator of Comparative Example 1 were manufactured according to the same method as Example 1 except for not including the first polyvinylidene fluoride-based polymer solution and only including the second polyvinylidene fluoride-based polymer solution.

Comparative Example 2

A bonding layer composition and a separator of Comparative Example 2 were manufactured according to the same method as Example 1 except for not including the second polyvinylidene fluoride-based polymer solution and only including the first polyvinylidene fluoride-based polymer solution.

Comparative Example 3

A bonding layer composition and a separator of Comparative Example 3 were manufactured according to the same method as Example 1 except for using a 8 wt % polyvinylidene fluoride-based binder solution prepared by dissolving a polyvinylidene fluoride-based binder (HSV 50, Arkema Inc.) (weight average molecular weight of about 1,600,000 and hexafluoropropylene (HFP) content of less than 1 wt %) in a mixed solution of acetone/DMAc (a weight ratio=10:90) and stirring the solution with an agitator at 25° C. for 4 hours instead of the second polyvinylidene fluoride-based polymer solution.

Composition and content (unit: wt %) of the bonding layer compositions according to Examples 1 to 4 and Comparative Examples 1 to 3 were shown in Table 1.

TABLE 1

|  |  | Ex. 1 | Ex. 2 | Ex. 3 | Ex. 4 | Comp. Ex. 1 | Comp. Ex. 2 | Comp. Ex. 3 |
|---|---|---|---|---|---|---|---|---|
| A | molecular weight | 500,000 | 500,000 | 500,000 | 500,000 | — | 500,000 | 500,000 |
|  | polymer | copolymer | Copolymer | copolymer | copolymer | — | copolymer | Copolymer |
|  | HFP content (wt %) | 12 | 12 | 12 | 12 | — | 12 | 12 |
| B | Weight average molecular weight | 1,100,000 | 1,100,000 | 1,100,000 | 1,000,000 | 1,100,000 | — | 1,600,000 |
|  | AA content (wt %) | less than 1 wt % | less than 1 wt % | less than 1 wt % | — | less than 1 wt % | — | — |
|  | carboxyl group (wt %) | — | — | — | 1 wt % | — | — | — |
|  | HFP content (wt %) | — | — | — | — | — | — | less than 1 wt % |
|  | A:B (weight ratio) | 2:8 | 3:7 | 5:5 | 2:8 | 0:10 | 10:0 | 2:8 |
|  | (A + B):C (weight ratio) | — | — | 5:5 | — | — | — | — |

A: first polyvinylidene fluoride-based polymer
B: second polyvinylidene fluoride-based polymer
C: inorganic particle

EXPERIMENTAL EXAMPLES

Properties of the separators according to Examples 1 to 4 and Comparative Examples 1 to 3 were measured in the following method, and the results are shown in Tables 2 and 3.

Experimental Example 1

Air Permeability of Separator

Each separator of Examples and Comparative Examples was cut into a size capable of containing a disk having a diameter of greater than or equal to 1 inch at ten different points to obtain ten specimens, and air permeability of the separator was evaluated by measuring how long each specimen passed 100 cc of air with a device, EG01-55-1MR (Asahi Seiko Inc.). The time was respectively five times measured and then, averaged to obtain the air permeability (sec/100 cc).

Experimental Example 2

Active Material Transfer Rate after Charge and Discharge

A 114 μm-thick positive electrode was manufactured by coating LCO (LiCoO$_2$) as a positive active material to be 94 μm thick on a 20 μm-thick aluminum foil and then, drying and compressing it. A 130 μm-thick negative electrode was manufactured by coating a mixture of natural graphite and artificial graphite in a ratio of 1:1 as a negative active material to be 120 μm thick on a 10 μm-thick copper foil and then, drying and compressing it. An electrolyte solution was prepared by mixing 1.5 M LiPF$_6$ (PANAX ETEC Co., Ltd.) with an organic solvent of EC/EMC/DEC+0.2% LiBF$_4$+5.0% FEC+1.0% VC+3.00% SN+1.0% PS+1.0% SA.

Each separator according to Examples and Comparative Examples (the area of both surfaces: A$_0$) was interposed between the positive and negative electrodes and wound therewith to form a 7 cm×6.5 cm jelly roll-shaped electrode assembly. The electrode assembly was primarily compressed at 100° C. for 3 seconds under a pressure of 3 kgf/cm$^2$ and then, housed in an aluminum coating pouch (8 cm×12 cm), two neighboring edges of the pouch were sealed at 143° C., 6.5 g of the electrolyte solution was injected thereinto, and then, the case was sealed for greater than or equal to 3 minutes with a degassing machine until air was not left in a battery cell. The battery cell was aged for 12 hours at 25° C. and secondarily compressed at 100° C. for 30 seconds under a pressure of 30 kgf/cm$^2$. The battery cell was pre-charged at 4.35 V and 0.2 C for 1 hour, after removing gas inside the battery cell, the battery cell was charged and discharged under the following charge and discharge condition and then, decomposed, and the areas that negative and positive active materials were transferred into the separator were measured by using an image analyzer (Easy Measure converter 1.0.0.4) and summed to obtain a transfer area (A$_1$).

(Charge) 4.35 V, 0.2 C, 50 mA cut-off, and 5 hours (Discharge) 0.2 C, 3 V cut-off, and 5 hours
(Charge) 0.5 C, 4 V cut-off, and 2 hours The transfer area ($A_1$) was divided by the entire area ($A_0$) of the separator and then, multiplied by 100 to obtain a transfer rate (%) of the positive or negative active material into the separator.

Experimental Example 3

Adhesion Force to Porous Substrate

Adhesion force to a porous substrate was evaluated according to the Korean Industrial Standard KS-A-01107 (a test method of an adhesive tape and sheet) Article 8. Each separator according to Examples and Comparative Examples was cut to have a size of a width of 25 mm and a length of 250 mm, a tape (Nitto 31B) was respectively adhered to both surfaces thereof to obtain a specimen, and the specimen was once compressed back and forth at a speed of 300 mm/min with a roller having a load of 2 kg. Thirty minutes later after the compression, the specimen was 180° overturned and then, about 25 mm peeled off, and the separator and the tape adhered on one surface of the separator were fixed into an upper clip of a tensile strength tester (Instron Series 1X/s Automated materials Tester-3343, Instron). The tape on the other surface of the separator was fixed into a lower clip of the tensile strength tester and pulled at a speed of 60 mm/min to measure a pressure when the porous bonding layer was peeled off from the porous substrate.

Experimental Example 4

Adhesion Force to Positive Electrode

Adhesion force of each separator to a positive electrode was measured according to the Korean industrial Standard KS-A-01107 (a test method of an adhesive tape and sheet) Article 8. Each separator film was cut to have a width of 25 mm and a length of 250 mm, a tape (Nitto 31B) was adhered to one surface of the separator to manufacture a specimen, a positive electrode film (positive active material (LCO (lithium cobalt oxide))/binder (styrene butadiene rubber (SBR)+carboxyl methyl cellulose (CMC))/conductive material (carbon black)=95/2.5/2.5) was adhered to the other surface of the separator, and the specimen was compressed by once reciprocating a roller having a load of 2 kg at a speed of 300 mm/min. Thirty minutes later after the compression, the specimen was 180° overturned and about 25 mm peeled off, and the separator and the tape on the one surface of the separator were fixed into an upper clip of a tensile strength tester (Instron Series 1X/s Automated materials Tester-3343, Instron). The positive electrode film on the other surface of the separator was fixed into a lower clip and then, pulled at a speed of 60 mm/min to measure a pressure when the positive electrode film was peeled off from the separator.

Experimental Example 5

Adhesion Force to Negative Electrode

An adhesion force of each separator to a negative electrode was evaluated according to the Korean Industrial Standard KS-A-01107 (a test method of an adhesive tape and sheet), Article 8. Each separator film was cut to have a width of 25 mm and a length of 250 mm, a tape (Nitto 31B) was adhered to one surface of the separator to manufacture a specimen, a negative electrode film (negative active material (natural graphite)/binder (styrene butadiene rubber (SBR)+carboxyl methyl cellulose (CMC) 5%)/conductive material (carbon black)=98/1/1) was adhered to the other surface of the separator, and the specimen was compressed by once reciprocating a roller having a load of 2 kg at a speed of 300 mm/min. Then, 30 minutes later, the specimen was 180° overturned and about 25 mm peeled off, and the separator and the tape on the one surface of the separator were fixed into an upper clip of a tensile strength tester (Instron Series 1X/s Automated materials Tester-3343, Instron). The negative electrode film on the other surface of the separator was fixed into a lower clip and pulled at a speed of 60 mm/min to measure a pressure when the negative electrode film was peeled off from the separator.

TABLE 2

| | Example 1 | Example 2 | Example 3 | Example 4 |
| --- | --- | --- | --- | --- |
| Air permeability (sec/100 cc) | 250 | 245 | 190 | 265 |
| Active material transfer rate after charge and discharge (%) | 70 | 60 | 40 | 70 |
| Adhesion force to substrate (N/mm) | 0.93 | 0.81 | 0.5 | 0.88 |
| Adhesion force to positive electrode (gf/5 mm) | 1.51 | 1.40 | 0.98 | 1.48 |
| Adhesion force to negative electrode (gf/5 mm) | 0.54 | 0.45 | 0.32 | 0.50 |

TABLE 3

| | Comparative Example 1 | Comparative Example 2 | Comparative Example 3 |
| --- | --- | --- | --- |
| Air permeability (sec/100 cc) | 2020 | 180 | 820 |
| Active material transfer rate after charge and discharge (%) | 70 | 5 | 4 |
| Adhesion force to substrate (N/mm) | 0.98 | 0.02 | 0.05 |
| Adhesion force to positive electrode (gf/5 mm) | 1.9 | 0.01 | 0.05 |
| Adhesion force to negative electrode (gf/5 mm) | 0.54 | 0.01 | 0.01 |

As may be seen in Tables 2 and 3, the separators of Examples 1 to 4 exhibited satisfactory air permeability, a high active material transfer rate, improved adhesion forces to the substrate, and improved adhesion forces to a positive electrode and to a negative electrode after charge and discharge. The separator only including the first polyvinylidene fluoride-based polymer according to Comparative Example 1 exhibited sharply deteriorated air permeability. The separator including only the second polyvinylidene fluoride-based polymer according to Comparative Example 2, and the separator including another second polyvinylidene fluoride-based polymer according to Comparative Example 3 exhibited sharply deteriorated active material transfer rate, adhesion forces to the substrate, and adhesion force to a positive or negative electrode after charge and discharge.

By way of summation and review, an electric vehicle and a hybrid electric vehicle may replace a vehicle using solely a coal fuel such as a gasoline vehicle, a diesel vehicle, and the like, which is regarded to mainly cause an air pollution, as an interest in the environment has been recently increased. Research on the rechargeable lithium battery as a power source for the electric vehicle, the hybrid electric vehicle, and the like is actively being made and thus partly commercially available and used.

Accordingly, a high power/large capacity battery for the electric vehicle and the like may be useful along with a recent lightening and thinness tendency of an electrochemical battery for increasing portability of an electronic device such as a mobile device, a laptop, and the like. Likewise, a separator for a battery may exhibit thinness and lightening and simultaneously, of a strong adhesion force, shape stability, and the like to produce a high-capacity battery.

The embodiments may provide a separator having good air permeability. A coating process using an organic solvent is possible and shape stability of a battery may be improved. Adhesion force to a substrate and to an electrode may be improved.

The separator according to an example embodiment may exhibit improved adhesion forces to a substrate and an electrode, air permeability, and shape stability of a battery as well as good coating processibility due to improved solubility in a low-boiling-point organic solvent.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A separator, comprising
a porous substrate; and
a porous bonding layer on one surface or both surfaces of the porous substrate,
wherein the porous bonding layer includes:
a first polyvinylidene fluoride-based polymer, the first polyvinylidene fluoride-based polymer including a polyvinylidene fluoride-based homopolymer or a polyvinylidene fluoride-based copolymer that includes a vinylidene fluoride repeating unit and a hexafluoropropylene repeating unit, and
a second polyvinylidene fluoride-based polymer, the second polyvinylidene fluoride-based polymer including:
a vinylidene fluoride repeating unit and a (meth)acrylate repeating unit, or
a vinylidene fluoride repeating unit and a repeating unit of a monomer that includes at least one of an epoxy group, a hydroxy group, a carboxyl group, an ester group, or an acid anhydride group,
wherein a weight ratio of the first polyvinylidene fluoride-based polymer and the second polyvinylidene fluoride-based polymer is about 2:8 to about 5:5,
wherein the first polyvinylidene fluoride-based polymer includes the polyvinylidene fluoride-based copolymer, and a content of the hexafluoropropylene of the polyvinylidene fluoride-based copolymer of the first polyvinylidene fluoride-based polymer is about 5 wt % to about 20 wt %, based on a total weight of the copolymer,
wherein a weight average molecular weight of the polyvinylidene fluoride-based copolymer including the vinylidene fluoride repeating unit and the hexafluoropropylene repeating unit of the first polyvinylidene fluoride-based polymer is less than or equal to about 800,000 gram/mole,
wherein a content of the vinylidene fluoride repeating unit of the second polyvinylidene fluoride-based polymer is greater than or equal to 87 wt %, based on a total weight of the second polyvinylidene fluoride-based polymer, and
wherein a weight average molecular weight of the second polyvinylidene fluoride-based polymer is from 800,000 to 1,500,000 gram/mole.

2. The separator as claimed in claim 1, wherein:
a content of the (meth)acrylate repeating unit is less than or equal to about 10 wt %, based on a total weight of the second polyvinylidene fluoride-based polymer, or
a content of the repeating unit of the monomer including at least one of an epoxy group, a hydroxy group, a carboxyl group, an ester group, or an acid anhydride group is less than or equal to about 10 wt %, based on the total weight of the second polyvinylidene fluoride-based polymer.

3. The separator as claimed in claim 1, wherein the second polyvinylidene fluoride-based polymer is a polymer including the (meth)acrylate repeating unit and the vinylidene fluoride repeating unit.

4. The separator as claimed in claim 1, wherein the porous bonding layer further includes inorganic particles.

5. The separator as claimed in claim 4, wherein a weight ratio of the inorganic particles to the first polyvinylidene fluoride-based polymer and the second polyvinylidene fluoride-based polymer is about 8:2 to about 2:8.

6. The separator as claimed in claim 1, wherein an average transfer rate of positive and negative active materials into the separator is greater than or equal to about 30% after charge and discharge, as calculated by Equation 1:

$$\text{Transfer rate (\%)} = (A_1/A_0) \times 100 \qquad \text{Equation 1}$$

wherein in Equation 1,
$A_0$ denotes the entire area of both surfaces of the separator,
$A_1$ denotes an area sum of positive and negative active materials transferred into the separator when a cell is manufactured by interposing the separator between positive and negative electrodes, primarily compressing them at about 95° C. to about 105° C. for about 1 to about 5 seconds with a pressure of about 1 to about 5 kgf/cm$^2$, injecting an electrolyte solution into the compressed positive electrode/separator/negative electrode structure, and secondarily compressing it at about 95° C. to about 105° C. for about 25 to about 40 seconds with a pressure of about 10 to about 200 kgf/cm$^2$ and then, sequentially charging and discharging under the following conditions:

Charge: 4.35 V, 0.2 C, 50 mA cut-off, and 5 hours,
Discharge: 0.2 C, 3 V cut-off, and 5 hours, and
Charge: 0.5 C, 4 V cut-off, and 2 hours.

7. The separator as claimed in claim 1, wherein an air permeability of the separator is less than or equal to about 300 sec/100 cc.

8. The separator as claimed in claim 1, wherein an adhesion force of the porous bonding layer to the porous substrate is greater than or equal to about 0.05 N/mm.

9. An electrochemical battery, comprising:
a positive electrode;

a negative electrode;
the separator as claimed in claim 1; and
an electrolyte solution.

10. The electrochemical battery as claimed in claim 9, wherein:
   an adhesion force of the separator to the positive electrode is greater than or equal to about 0.5 gf/5 mm, and
   an adhesion force of the separator to the negative electrode is greater than or equal to about 0.1 gf/5 mm.

11. The electrochemical battery as claimed in claim 9, wherein the electrochemical battery is a rechargeable lithium battery.

12. The separator as claimed in claim 1, wherein the first polyvinylidene fluoride-based polymer is different from the second polyvinylidene fluoride-based polymer.

* * * * *